B. F. FIELD.

Assignor to THE FIELD PATENT WATER PURIFIER COMPANY.

WATER PURIFIER AND SCALE ARRESTER.

No. 11,143. Reissued Feb. 10, 1891.

Witnesses
E. D. Smith
Thomas Durant.

Inventor
Benjamin F. Field.
by Chas. E. Church
his Attorneys

THE NORRIS PETERS CO., PHOTO-LITHO., WASHINGTON, D. C.

UNITED STATES PATENT OFFICE.

BENJAMIN F. FIELD, OF CHICAGO, ILLINOIS, ASSIGNOR TO THE FIELD PATENT WATER PURIFIER COMPANY, OF SAME PLACE.

WATER-PURIFIER AND SCALE-ARRESTER.

SPECIFICATION forming part of Reissued Letters Patent No. 11,143, dated February 10, 1891.

Original No 410,509, dated September 3, 1889. Application for reissue filed January 9, 1891. Serial No. 377,298.

*To all whom it may concern:*

Be it known that I, BENJAMIN F. FIELD, of Chicago, in the county of Cook and State of Illinois, have invented certain new and useful Improvements in Water-Purifiers and Scale-Arresters; and I do hereby declare the following to be a full, clear, and exact description of the same, reference being had to the accompanying drawings, forming a part of this specification, and to the letters of reference marked thereon.

This invention has for its object to provide a simple and efficient means for effecting the separation and removal of the sediment and scale-producing substances contained in the water delivered to the boiler, so as to preserve the steam-producing capacity of the latter; and it consists in the novel and improved construction and arrangement of devices for this purpose, as hereinafter described, and pointed out in the claims.

Figure 1:
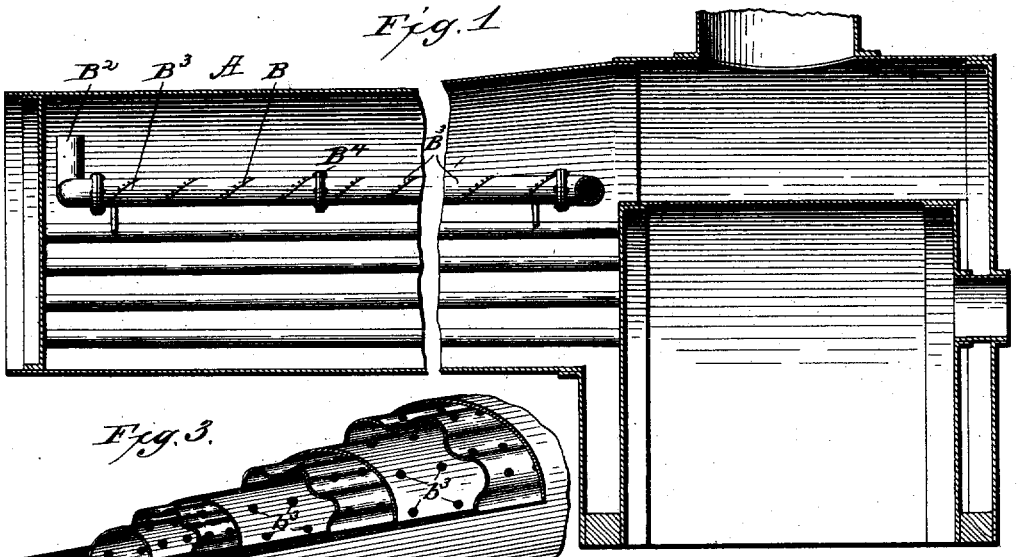
Figure 3:
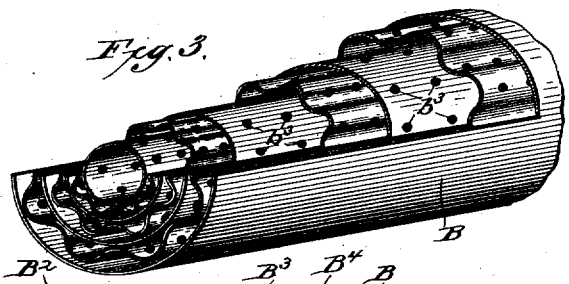
Figure 2:
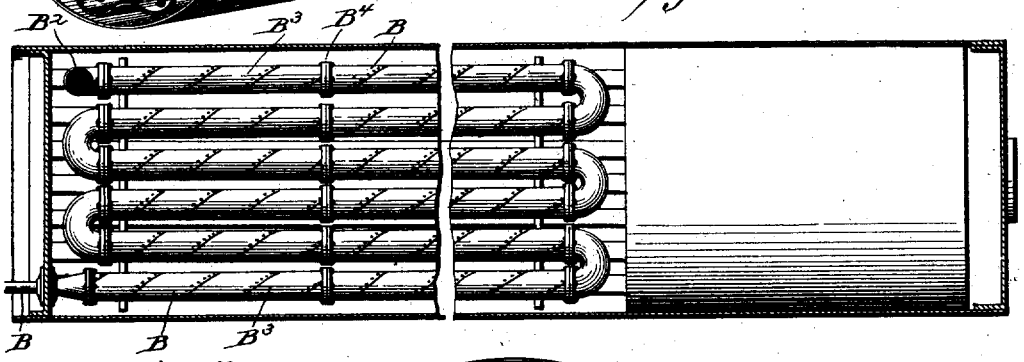
Figure 5:
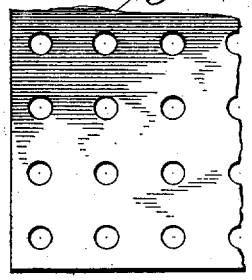
Figure 4:
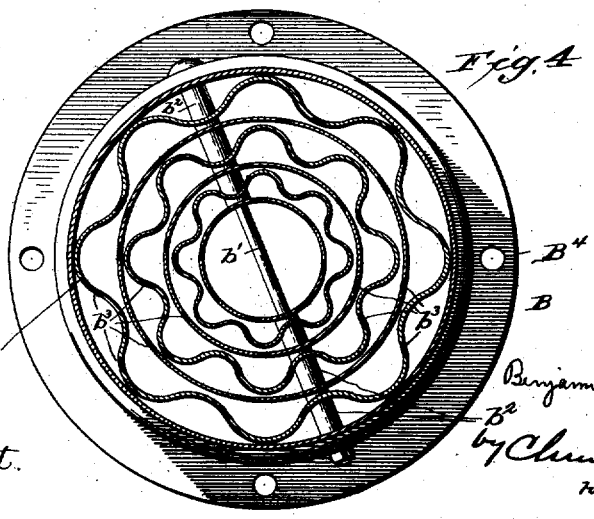

In the drawings, Figure 1 is a longitudinal vertical section, and Fig. 2 a transverse horizontal section, through a boiler, showing one mode of applying my improvements. Fig. 3 is a perspective view, partly in section, showing the interior construction and arrangement of the plates or tubes. Fig. 4 is a transverse sectional view of one of the sections. Fig. 5 is a detail illustrating the perforated sheet from which the inner tubes are made.

Similar letters of reference in the several figures indicate the same parts.

As my improvements are more especially designed and intended for use in connection with locomotive-boilers, although applicable as well to other forms and styles, I have illustrated them in connection with and as applied to a locomotive-boiler A of the conventional form.

The letter B designates a tube or conduit, through which the feed-water is conducted from a feed-pipe B′ and delivered through a discharge-pipe $B^2$ into the boiler. The tube or conduit B is preferably constructed in sections $B^3$, detachably secured together and connected by suitable couplings or joints $B^4$, and said conduit is horizontally disposed and so located that it will stand partially below the water-line, while the discharge-pipe $B^2$ is projected vertically into the steam-space. Within some or all of the sections $B^3$ are arranged a series of thin metal plates, preferably in the form of tubes *b* of different diameters and located one within the other, as represented in Figs. 3 and 4, said tubes *b* being properly supported and held apart, as by a transverse bolt *b′* and collars or washers $b^2$, so as to maintain them in proper relative positions and prevent longitudinal displacement.

In order to obtain increased surface area, some or all of the tubes *b* are corrugated, preferably longitudinally, as shown. Thus in the example given alternate tubes *b* of the series are corrugated.

To facilitate and permit an equal circulation of water within the tube B during its passage therethrough and to equalize the flow, the several tubes *b*, which serve to divide the interior of the conduit into a series of passages, are perforated or provided with openings $b^3$, care being taken to form clean-cut openings in the walls of the tubes *b*, so as to prevent interference with the free circulation of the water or afford places for the lodgment of sediment.

It is not always desirable or necessary to provide the conduit B with the internal longitudinal partitions or pipes *b* throughout its entire length—as, for example, when feeding cold water the tubes *b* may be omitted—in the front or induction end of the conduit or up to a point where the scale-producing material begins to be deposited, which point is not reached until the water has attained a certain degree of temperature, depending somewhat upon the character or quality of the water used; nor is it necessary that the feed-water should be retained within the conduit B beyond the point at which it has been deprived of its scale-producing materials. Hence one or more additional or supplemental discharge-pipes may be located at suitable points in the length of the conduit.

Having described the preferred form of embodiment of my invention, I will now explain its purposes, functions, and capacities.

The internal diameter of the conduit B is very much greater than that of the feed-pipe B′. Hence the stream of water passing through it moves with much less velocity and in a larger volume, thereby permitting the heavier particles or sediment to settle within the conduit. As the stream of water flows through the conduit its temperature gradually increases until when it reaches the discharge orifice or pipe it has attained very nearly the temperature of the water within the boiler. As the temperature is thus raised the scale-producing materials in the water are liberated or rendered active. Ordinarily the water is discharged into the boiler while in this condition, and as a result the active scale-producing materials at once attack the exposed surfaces of the interior of the boiler. It is with a view to protecting the interior of the boiler by localizing the action of the scale-producing materials and confining them within the conduit B that I introduce the thin corrugated tubes *b* within the conduit, thereby presenting a large surface area of metal to the direct action of these active scale-producing materials, so that the latter will be withdrawn from the water before it is discharged into the boiler. The stream of water flowing through the conduit is subdivided by the tubes *b* and distributed over the surface of the latter in a manner to facilitate the formation of scale thereon or the deposit of the scale-forming substances, so that when the water emerges or is discharged into the boiler it will have been deprived of these active elements and be rendered practically inert, so far as the formation of scale is concerned. By perforating the tubes not only is the flow of the water equalized, but the surface area exposed to the direct action of the water is increased.

When it is desired to clear the conduit of sediment, a valve in the feed-pipe, such as is ordinarily employed therein for a blow-off, is opened and the steam permitted to blow through the conduit, and as there is a clear passage provided throughout the length of said conduit and the tubes *b* are held apart, as described, there are no corners or depository formed wherein the sediment can find lodgment and protection from the blast of steam.

In the course of time the scale which attaches to or is formed upon the surfaces of the tubes *b*, unless removed by being blown out or otherwise, may interfere with the proper action of the device and it will become necessary to clean the surfaces mechanically or renew the pipes. This can readily be accomplished by removing the sections $B^3$, one or more at a time, and cleaning the pipes *b* or inserting new ones, and the latter can be accomplished at slight expense and with the expenditure of but little time and labor, as said pipes are made of thin sheet or plate iron, and are readily detached and inserted by the withdrawal and reapplication of the bolt or bolts *b′*.

With a view to protecting or preserving the outer tube or wall of the conduit I make the sections of galvanized iron, the zinc or lead, or both, of these metals contained in the coating acting as a preventive or at least retarding the formation of scale on the surface of the tube.

Having thus described my invention, what I claim as new is—

1. The combination, with a steam-boiler, of a conduit B, located within the boiler, connected to the feed-water pipe, and having a discharge pipe or orifice within the boiler above the water-line and communicating with the steam-space, said conduit being provided with a series of tubes arranged within and extending longitudinally thereof, substantially as described.

2. The combination, with a steam-boiler and a conduit B, horizontally disposed within the boiler and connected to the feed-pipe at one end and provided with a discharge-pipe at the opposite end above the water-line, of a series of corrugated tubes open at both ends and contained one within another, said tubes being longitudinally disposed within the conduit B, substantially as described.

3. In combination with a steam-boiler and the feed-pipe thereof, a conduit B, connected to the feed-pipe and provided with a discharge above the water-line, said conduit being composed of a series of separate pipes or sections detachably secured together and one or more of said sections provided with a series of open-ended corrugated tubes held in position within and longitudinally of the section by a transverse bolt, with spacing devices for holding the several tubes separated, substantially as and for the purpose set forth.

4. The combination, substantially as described, with the boiler and feed-pipe, of the sectional conduit B, composed of a series of outer pipes or sections provided with non-scaling surfaces and a series of removable internal tubes or plates composed of materials, such as iron or steel, for which the scale-forming materials contained in the water manifest an affinity, as and for the purpose set forth.

5. The combination, with a steam-boiler and with the feed-water pipe, of a conduit B, provided with a discharge-pipe opening with the boiler, said conduit being composed of an outer tube and a series of inner tubes arranged one within another and disposed longitudinally of the outer tube, said inner tubes being open at both ends and perforated, as and for the purpose set forth.

6. In a conduit for conveying and heating the water and delivering the latter into a boiler, an outer tube and a series of inner tubes arranged one within another, said inner tubes being composed of corrugated and perforated plates open at both ends and held in place within the outer tube, and a transverse bolt passing through all of the tubes, with devices interposed between the inner tubes to hold them apart, substantially as and for the purpose set forth.

BENJAMIN F. FIELD.

Witnesses:

JNO. S. FIELD,

C. N. HUNT.